C. HUMMEL & F. PADBERG.
Utilizing Scrap-Leather.

No. 197,636.   Patented Nov. 27, 1877.

Inventors
Charles Hummel,
Francis Padberg
by Earle H. Smith
Atty.

Witnesses
Henry E. Roeder
John F. Allen

UNITED STATES PATENT OFFICE.

CHARLES HUMMEL AND FRANCIS PADBERG, OF NEW YORK, N. Y.

IMPROVEMENT IN UTILIZING SCRAP-LEATHER.

Specification forming part of Letters Patent No. 197,636, dated November 27, 1877; application filed July 14, 1877.

*To all whom it may concern:*

Be it known that we, CHARLES HUMMEL and FRANCIS PADBERG, both of the city, county, and State of New York, have invented certain Improvements in Utilizing Scrap-Leather, whereof the following is a specification:

Our invention relates to sheet-leather, and to soles and heels of boots and shoes formed from scrap sole-leather; and consists, first, in a new method of utilizing scrap sole-leather, consisting in uniting the parts or scraps, and so forming larger and useful sheets of leather, by means of tongues and grooves cut edgewise in the edges of the several pieces; second, in a new manufacture of sheet-leather formed of scrap-leather, united by tongues and grooves formed edgewise therein; third, insoles formed of scrap-leather tongued and grooved edgewise, and having the seam or seams secured by a line of rivets or machine-stitching; fourth, heels made of tongue-and-grooved scrap-leather, as aforesaid.

Figure 2:
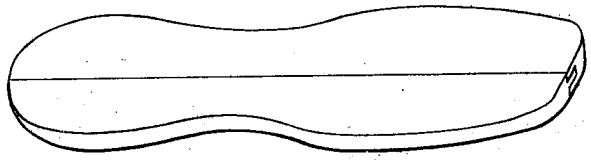
Figure 1:
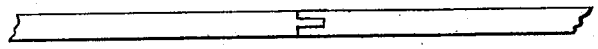
Figure 3:
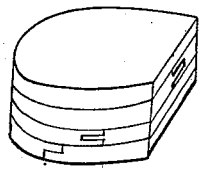

Referring to the drawing hereto annexed, Figure 1 shows a section of sheet-leather or scrap stock made of pieces joined together by a tongue-and-groove union. Fig. 2 represents an insole made from sheet-leather formed of scraps joined by a tongue-and-groove seam. Fig. 3 is a perspective view of a heel made of united scraps having tongue-and-groove joints.

Primarily, our invention lies in the production of sheet-leather which shall be a marketable article, adapted to be made into soles and heels, and for other purposes.

We take small pieces of sole-leather, and having straightened the edges, we form longitudinal tongues and grooves therein, edgewise thereof. The matching edges are then inserted and joined together, and the larger piece or sheet so formed is placed in a suitable press, or passed between pressure-rolls. Cement may be applied to the parts before joining, or not.

For making insoles we secure the parts on the line of the tongue-and-groove seam by a number of rivets, or a row of machine-stitching, passing through the tongue, and through the two parts of the groove, on each side of it.

When used for making heels, sheets of the full diameter of the heel, formed of two or more smaller pieces united by tongues and grooves, are used, such sheets being laid up promiscuously without reference to breaking joints, as the tongue-and-groove union obviates that necessity; and when nails are used they may be driven through the joints, and will further secure them if caused to pass through the upper and lower lips of the grooves and through the tongues.

We are aware that heels have been patented made of pieces having their edges scarfed and joined by a simple lap-joint; also, that heels made of pieces notched and dove-tailed together flatwise are well known.

We claim as our invention—

1. The method of utilizing scrap sole-leather, consisting in forming a union of the pieces by means of tongues and grooves cut edgewise in the edges of the contiguous parts.

2. Sheet-leather, as an article of manufacture, formed of scrap sole-leather united by tongues and grooves formed edgewise in the edges of the parts at the place of union.

3. Boot and shoe soles and heels composed of tongue-and-groove pieces of leather united or secured to each other by rivets or stitching, substantially as described.

CHAS. HUMMEL.
FRANCIS PADBERG.

Witnesses:
EARLE H. SMITH,
JOHN MACDOUGALL.